(12) United States Patent
Hasegawa et al.

(10) Patent No.: US 7,071,805 B2
(45) Date of Patent: Jul. 4, 2006

(54) MULTILAYER CERAMIC COIL AND MOTOR USING THE SAME

(75) Inventors: Makoto Hasegawa, Tottori (JP); Tsuguo Inazawa, Tottori (JP); Keisuke Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 142 days.

(21) Appl. No.: 10/497,528

(22) PCT Filed: Dec. 2, 2002

(86) PCT No.: PCT/JP02/12585

§ 371 (c)(1),
(2), (4) Date: Jun. 3, 2004

(87) PCT Pub. No.: WO03/049251

PCT Pub. Date: Jun. 12, 2003

(65) Prior Publication Data

US 2005/0037183 A1 Feb. 17, 2005

(30) Foreign Application Priority Data

Dec. 6, 2001 (JP) .............................. 2001-372282

(51) Int. Cl.
*H01F 5/00* (2006.01)

(52) U.S. Cl. .................. 336/200; 226/232; 310/DIG. 6

(58) Field of Classification Search .......... 310/DIG. 6; 336/232, 200, 223
See application file for complete search history.

(56) References Cited

U.S. PATENT DOCUMENTS

| | | | |
|---|---|---|---|
| 4,804,574 A | 2/1989 | Osawa et al. | |
| 5,462,763 A | 10/1995 | Kondoh | |
| 6,388,551 B1* | 5/2002 | Morikawa | 336/223 |
| 6,437,677 B1* | 8/2002 | Takeuchi et al. | 336/200 |
| 6,489,877 B1 | 12/2002 | Yamamoto et al. | |
| 6,498,556 B1* | 12/2002 | Iida et al. | 336/200 |
| 6,587,025 B1* | 7/2003 | Smith et al. | 336/200 |

FOREIGN PATENT DOCUMENTS

| | | |
|---|---|---|
| DE | 100 55 634 | 5/2001 |
| JP | 59-169343 | 9/1984 |
| JP | 61-247255 | 11/1986 |
| JP | 64-59902 | 3/1989 |
| JP | 5-336712 | 12/1993 |

\* cited by examiner

*Primary Examiner*—Anh Mai
(74) *Attorney, Agent, or Firm*—Wenderoth, Lind & Ponack, L.L.P.

(57) ABSTRACT

A multilayer ceramic coil (4) for use in a compact motor is configured so that ceramic layers (4c) having a plurality of coil patterns (4a) and (4b) printed using a conductive paste are laminated, and that the coil patterns in respective layers are electrically connected via thru-holes (4d) to form a single multilayer ceramic structure having a plurality of phases of patterned-coil.

7 Claims, 5 Drawing Sheets

MULTILAYER CERAMIC COIL AND MOTOR USING THE SAME

BACKGROUND OF THE INVENTION

1. Technical Field

The present invention relates to a multilayer ceramic coil and a compact motor (hereafter referred to motor) using the same.

2. Background Art

As shown in FIG. 4, a typical conventional brushless motor comprises a plurality of coils 34 fixed on printed board 36 by soldering, and magnet 35 fixed on rotor frame 32 and opposing coils 34 across a gap.

A brushless motor of the above configuration has been provided with coils wound by metal wire. Nowadays, however, along with recent advances in printed wired board technology, a different coil manufacturing method is disclosed, e.g., in the Japanese publication of patent application No. S57-68565, No. S57-186940, No. S57-68656 or No. S58-33958. In this method, a printed pattern of a conductive coil pattern is applied on film 40 composed of epoxy resin, polyester resin and polyimide resin or the like to form coil sheet 44, and laminate a lot of those coil sheets 44 to form a multilayer coil, as shown in FIG. 5.

Such multilayer coil is advantageous to make a compact motor because a conventional core wound by metal wire is not necessary and wire winding density is high.

But the conventional multilayer coil mentioned above needs an additional process to apply an adhesive layer evenly on a plurality of respective coil sheets 44 for bonding, which results in the problem of high production costs.

Additionally, the coil sheet composed of plastic or composite materials has a poor thermal resistance and is easily affected by ambient temperature. Therefore, operation conditions such as the ambient temperature for a brushless motor must be restricted to prevent an unstable movement caused by heat generation due to copper loss and iron loss.

Consequently, in order to solve the above problems of the conventional multilayer coils, a method of manufacturing a coil configuration is disclosed in the Japanese publication of patent application No. H5-336712 which, as shown in FIG. 6, includes:

(a) forming a conductive coil pattern on a glass substrate, (b) providing the conductive coil pattern with a glass coating, and (c) forming a conductive coil pattern further on the glass coating, and finally, applying a glass coating on the top surface to produce a multilayer coil.

Generally, however, the glass used for such multilayer substrate has drawbacks of low impact resistance and a short performance life.

SUMMARY OF THE INVENTION

Therefore, a multilayer ceramic coil is proposed to include a plurality of ceramic layers having coil patterns printed with conductive paste, wherein the coil patterns of respective layers are electrically connected via thru-holes, and wherein the ceramic layers are laminated to form a single multilayer ceramic structure comprising a plurality of phases of coil.

DETAILED DESCRIPTION OF THE INVENTION

The present invention is described by following preferred embodiment with reference to drawings.

Exemplary Embodiment

Figure 1:
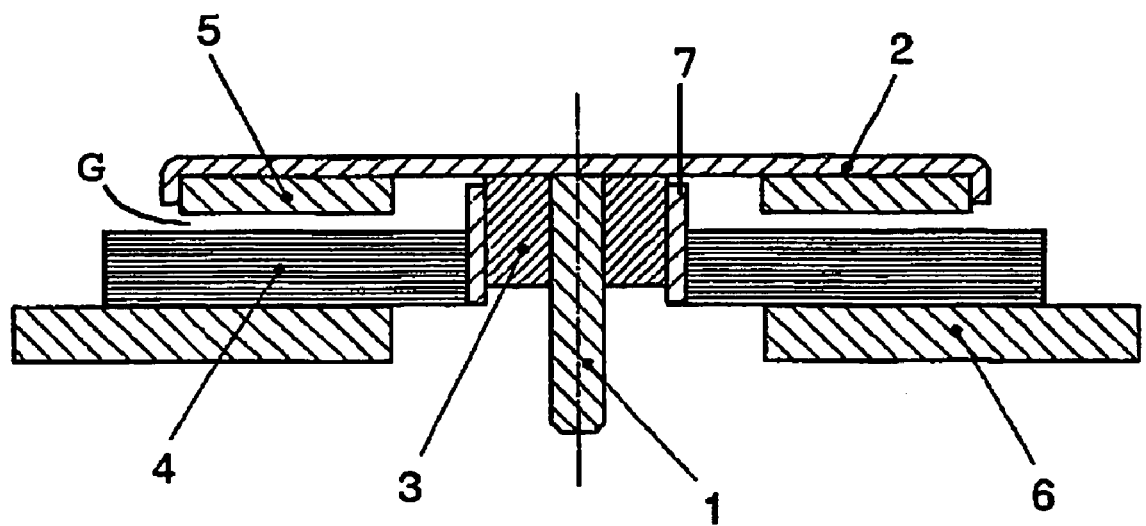
FIG. 1 is a cross-sectional view of a motor used in an exemplary embodiment of the present invention.

FIG. 1 shows a motor used in an exemplary embodiment of the present invention. A cross-sectional view of the motor is shown in FIG. 1. As shown in FIG. 1, rotation axle 1, having a rotation axis, is secured to rotor frame 2 and is disposed perpendicular thereto. Multilayer ceramic coil 4 is fastened on bearing 3 by means of a housing 7. Bearing 3 holds the rotation axle rotatably. Magnet 5 is secured on rotor frame 2 and opposes multilayer ceramic coil 4 across a gap G.

Delivering excitation current to multilayer ceramic coil 4, and thus causing attraction and repulsion of the magnet with respect to multilayer ceramic coil 4 produces a rotating force of the motor.

Figure 2A:
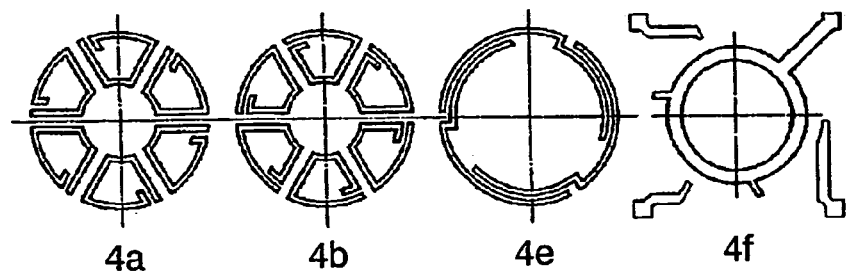
FIG. 2A is plan view of patterns of a multilayer ceramic coil used in the exemplary embodiment of the present invention.
Figure 2B:
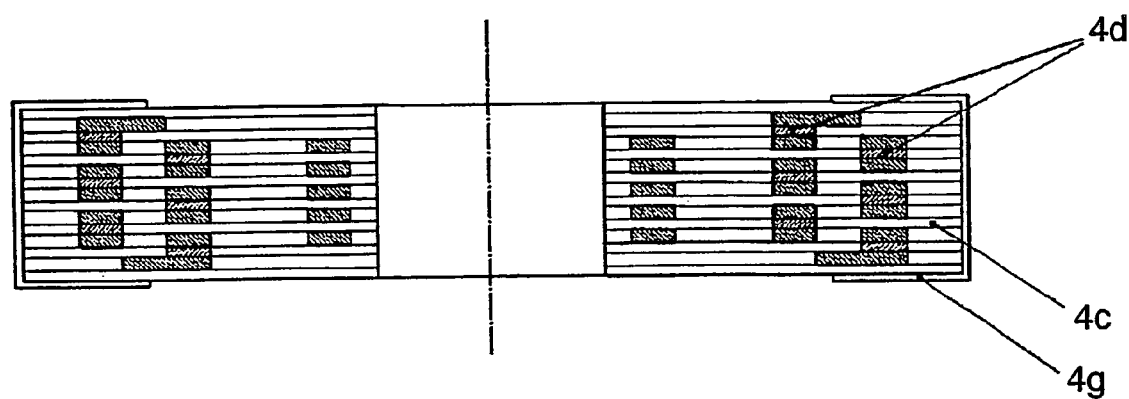
FIG. 2B is a cross-sectional view of a multilayer ceramic coil used in the exemplary embodiment of the present invention.
Figure 2C:
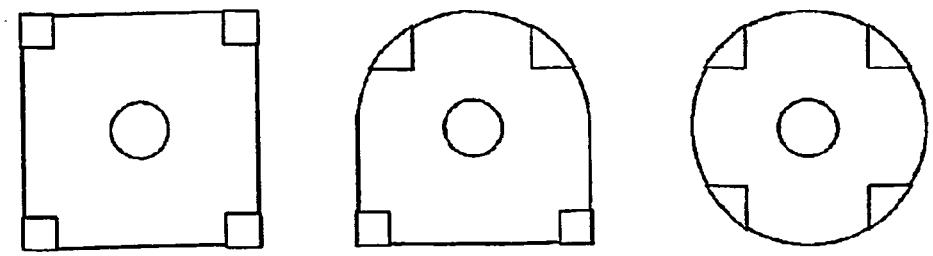
FIG. 2C is an outline view of a multilayer ceramic coil used in the exemplary embodiment of the present invention.

FIG. 2A is a plan view of configurations (patterns) of multilayer ceramic coil 4, FIG. 2B shows a cross-sectional view of the multilayer ceramic coil, and FIG. 2C shows an outline view of the multilayer ceramic coil 4.

Coil patterns 4a and 4b printed on ceramic layer 4c are electrically connected alternately via thru-holes 4d. Phases of coil patterns 4a and 4b are electrically connected to phases of crossing pattern 4e, respectively.

In addition, each phase terminal is electrically connected to outlet electrode 4g by means of terminal pattern 4f. Outlet electrodes 4g are mounted at four corners of multilayer ceramic coil 4. Outlet electrodes 4g are soldered on printed wired board 6 to secure multilayer ceramic coil 4 on the board.

Figure 3:
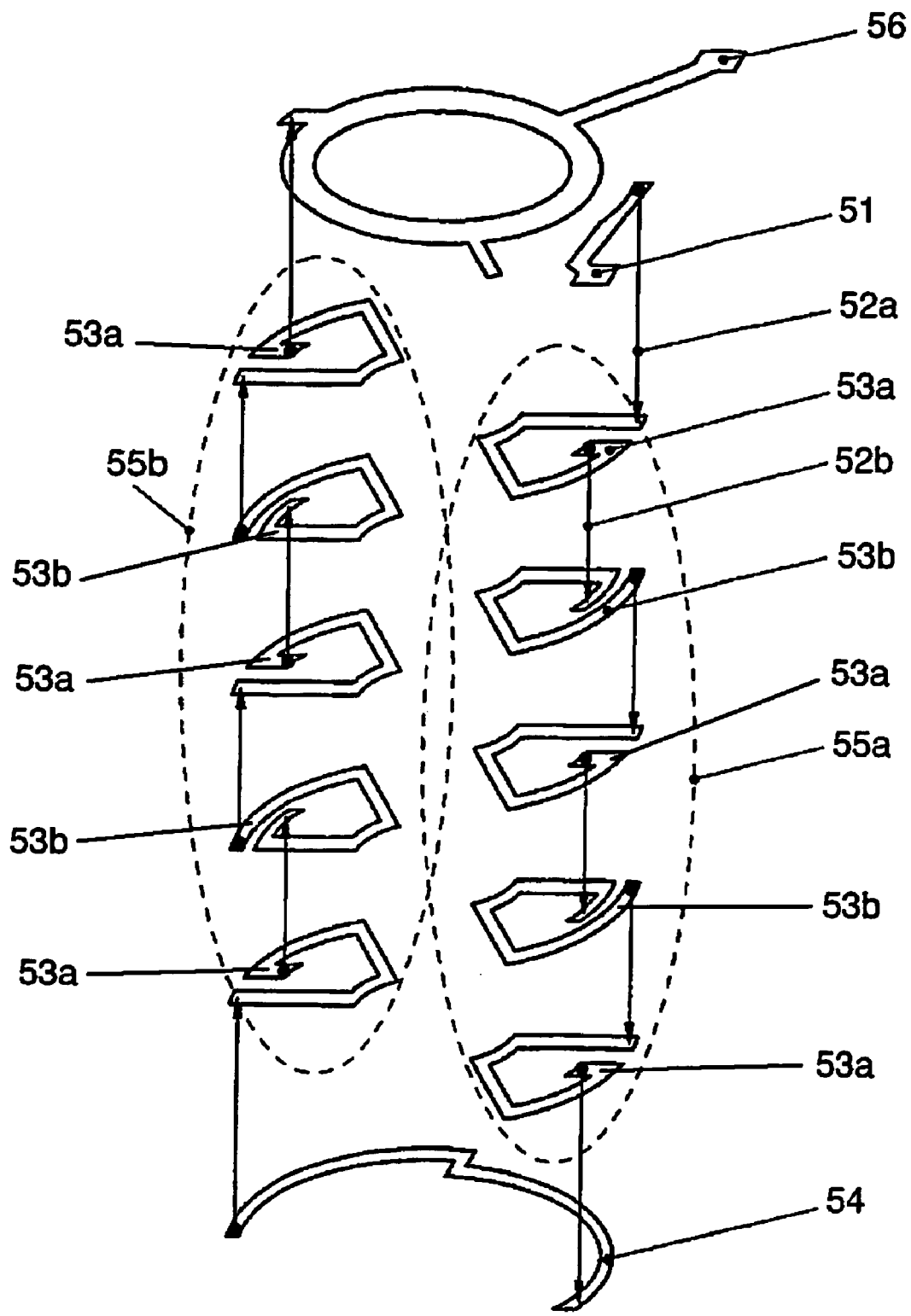
FIG. 3 is an exploded perspective view of a coil pattern for one phase of the coil pattern used in the exemplary embodiment of the present.
Figure 4:
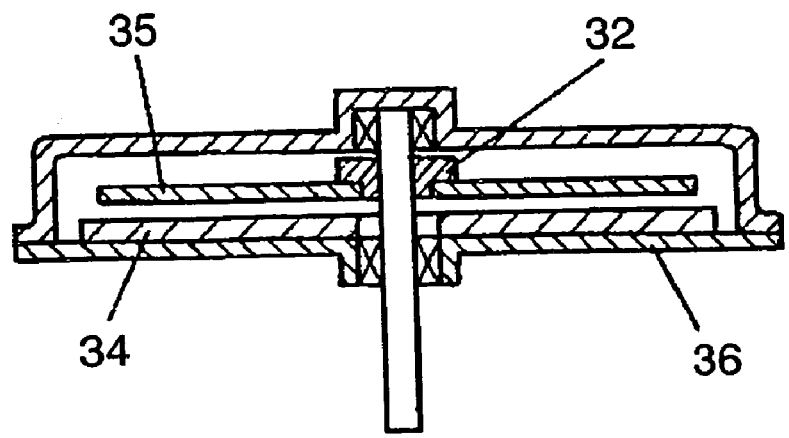
FIG. 4 is a cross-sectional view of a conventional motor.
Figure 5:
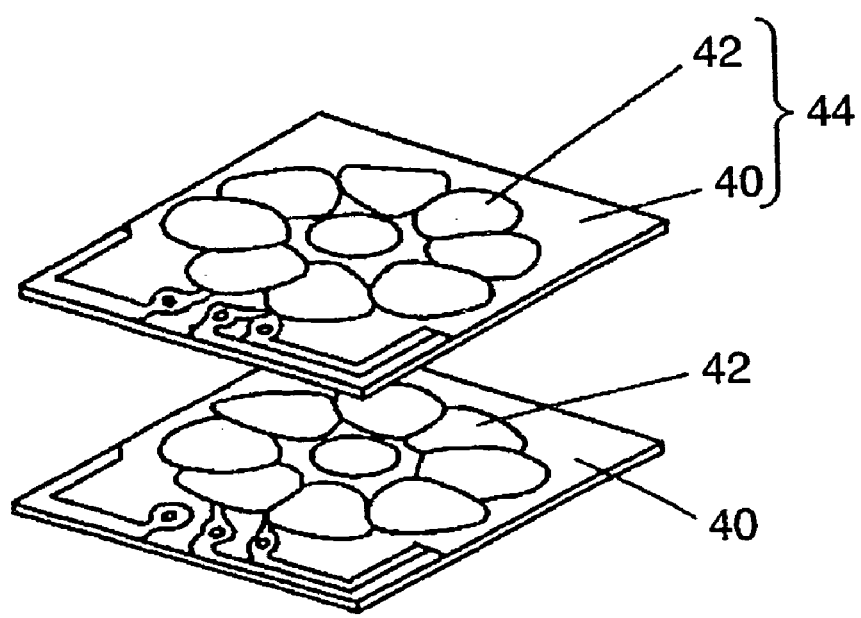
FIG. 5 is an exploded perspective view of a multilayer ceramic coil of a conventional motor.
Figure 6:
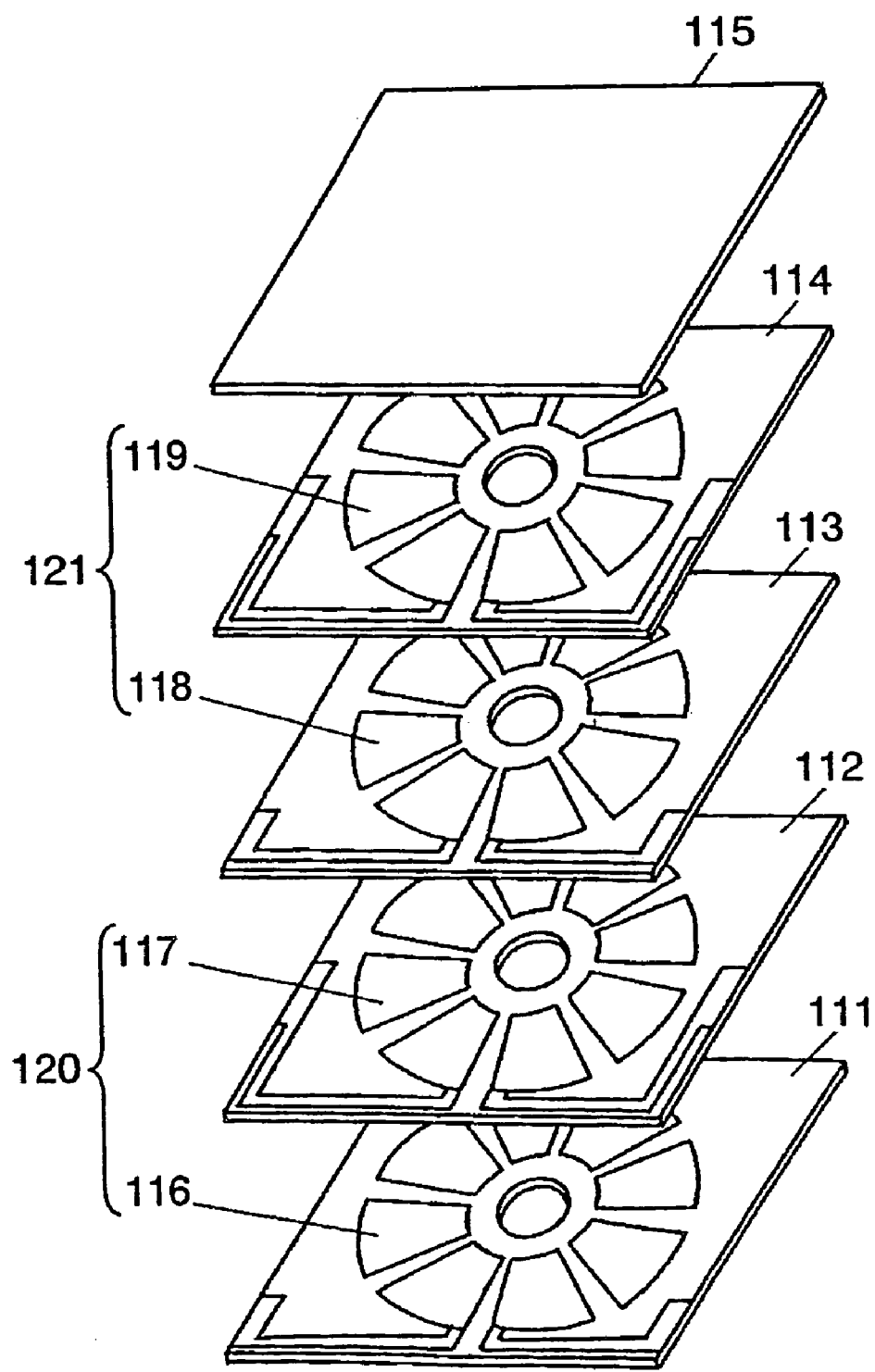
FIG. 6 is an exploded perspective view of a multilayer ceramic coil of another conventional motor.

Next, a procedure to form a coil pattern on multilayer ceramic is described in detail by setting forth process steps (a)–(g) with reference to FIG. 3. FIG. 3 is an exploded view of a winding formation for one phase of multilayer coil pattern.

(a) Connect individual terminal pattern 51 electrically to a winding top of coil pattern 53a, formed on a layer one layer below, via thru-hole 52a.

(b) Connect winding end of coil pattern 53a electrically to a winding top of coil pattern 53b of the formation, formed on a layer further one layer below, via thru-hole 52b.

(c) Laminate coil patterns 53a and 53b from top to bottom to form patterned-coil 55a in this way, via thru-holes 52a and 52b.

(d) Similarly, laminate coil patterns 53a and 53b from bottom to top to form patterned-coil 55b, via thru-holes 52a and 52b.

(e) Moreover, connect a winding end of coil pattern 53a on the bottom layer of patterned-coil 55a electrically to one end of crossing pattern phase 54, formed on a layer further one layer below, via thru-hole 52b.

(f) Connect another end of crossing pattern phase 54 electrically to a winding top of coil pattern 53a, formed on the bottom of patterned-coil 55b, via thru-hole 52a, to provide patterned-coil 55a and patterned-coil 55b with an electrical.

(g) Finally, connect a winding end of coil pattern 53a on the uppermost layer of patterned-coil 55b electrically to common terminal pattern 56 via thru-hole 52b to provide a patterned-coil having multiple outlet electrodes.

The multilayer ceramic coil disclosed in the present invention has such a configuration that conductive coil patterns are embedded and laminated in a multilayer ceramic structure to provide a coil formation to which excitation current of the motor is fed, which can solve problems of the conventional art.

The multilayer ceramic coil has a plurality of ceramic layers having coil patterns printed using conductive paste, connected to the coil patterns of respective layers electrically via thru-holes and laminated to form a single multilayer ceramic structure including a plurality of phases of patterned-coil. In addition, terminals of coil patterns formed inside of the multilayer ceramic structure are electrically connected to outlet electrodes disposed on surrounding surfaces of the multilayer ceramic coil to form terminals for feeding excitation current for the motor.

The present invention is not limited to the exemplary example mentioned above but can be used for various applications within the concept of this invention.

As mentioned above, the multilayer ceramic coil for use in a motor adopts ceramic as an innovative coating material. A motor equipped with the multilayer ceramic coil generates a stable torque force because the multilayer ceramic coil has a higher thermal resistance compared with coils provided by plastic, composite materials or glass and has a good heat conductivity. Additionally, the motor shows a reliable performance in various ambient conditions.

INDUSTRIAL APPLICABILITY

The present invention discloses a multilayer ceramic coil and a motor using the same. A multilayer ceramic coil for use in the motor is configured with conductive coil patterns embedded and laminated in a multilayer ceramic structure to provide a coil formation to which excitation current for the motor is supplied.

The invention claimed is:

1. A motor comprising:
a multilayer ceramic coil formed by a plurality of laminated ceramic layers on which patterns are printed, said patterns being formed of conductive paste;
wherein said multilayer ceramic coil includes
a first ceramic layer having a plurality of electrically independent coil patterns printed thereon, said coil patterns being formed of conductive paste,
a second ceramic layer having an electrical crossing pattern printed thereon, said crossing pattern being formed of conductive paste, and
a third ceramic layer having a terminal pattern printed thereon, said terminal pattern being formed of conductive paste;
wherein said first, second and third ceramic layers are arranged so as to constitute a single multilayer ceramic structure having a plurality of phases of coils, and wherein said coil patterns, said crossing pattern, and said terminal pattern are electrically connected via through-holes in said ceramic layers; and
wherein said terminal pattern of said third ceramic layer is formed with a common terminal and with a plurality of individual terminals equal in number to said plurality of phases of coils, said terminal pattern being electrically connected to each of said coil patterns.

2. The motor of claim 1, wherein
said first ceramic layer of said multilayer ceramic coil comprises a plurality of laminated layers.

3. The motor of claim 1, wherein
said second ceramic layer is disposed at an end of said plurality of laminated layers of said first ceramic layer.

4. The motor of claim 1, further comprising
a plurality of outlet electrodes respectively connected to said individual terminals of said terminal pattern.

5. The motor of claim 1, further comprising
a rotor frame rotatably mounted to said multilayer ceramic coil.

6. The motor of claim 5, further comprising
a bearing mounted to said multilayer ceramic coil and rotatably supporting said rotor frame.

7. The motor of claim 5, further comprising
a magnet mounted to said rotor frame and being disposed opposite said multilayer ceramic coil across a gap.

* * * * *